United States Patent
Manna et al.

(10) Patent No.: US 11,922,436 B2
(45) Date of Patent: Mar. 5, 2024

(54) SYSTEM AND METHOD FOR PRODUCT ASSORTMENT MANAGEMENT

(71) Applicant: Walmart Apollo, LLC, Bentonville, AR (US)

(72) Inventors: Sourit Manna, Hooghly (IN); Somedip Karmakar, Kolkata (IN); Arunita Das, Kalyangarh (IN)

(73) Assignee: Walmart Apollo, LLC, Bentonville, AR (US)

(*) Notice: Subject to any disclaimer, the term of this patent is extended or adjusted under 35 U.S.C. 154(b) by 89 days.

(21) Appl. No.: 17/072,294

(22) Filed: Oct. 16, 2020

(65) Prior Publication Data

US 2021/0035127 A1     Feb. 4, 2021

Related U.S. Application Data

(63) Continuation of application No. 16/508,538, filed on Jul. 11, 2019, now abandoned.

(60) Provisional application No. 62/733,412, filed on Sep. 19, 2018.

(30) Foreign Application Priority Data

Jul. 18, 2018 (IN) .............................. 201841026788

(51) Int. Cl.
G06Q 30/02      (2012.01)
G05D 1/00       (2006.01)
G06Q 10/0637    (2023.01)
G06Q 10/087     (2023.01)
G06Q 30/0201    (2023.01)

(52) U.S. Cl.
CPC ....... *G06Q 30/0201* (2013.01); *G05D 1/0221* (2013.01); *G06Q 10/0637* (2013.01); *G06Q 10/087* (2013.01)

(58) Field of Classification Search
None
See application file for complete search history.

(56) References Cited

U.S. PATENT DOCUMENTS

| | | | |
|---|---|---|---|
| 6,035,284 A | 3/2000 | Straub | |
| 8,032,406 B2 | 10/2011 | Ouimet | |
| 8,321,260 B2 | 11/2012 | Bottom | |
| 8,527,321 B2 | 9/2013 | Bottom | |
| 2003/0083925 A1* | 5/2003 | Weaver | G06Q 10/06 705/7.34 |
| 2003/0172007 A1 | 9/2003 | Helmolt | |
| 2003/0208503 A1 | 11/2003 | Roccaforte | |

(Continued)

OTHER PUBLICATIONS

Patil et al. (Automated Smart Shopping Cart, KIET IJCE KIET International Journal of Communications & Electronics, vol. 5, Issue No. 2 Jul.-Dec. 2017, ISSN:2320-8996, pp. 24-27).*

(Continued)

*Primary Examiner* — Matthew D Henry
(74) *Attorney, Agent, or Firm* — Fitch, Even, Tabin & Flannery LLP (57) ABSTRACT

Approaches are provided that determine and fine-tune product assortments carried by retail stores. In aspects, the number of stores that carry the item, the sales performance of the item, the loyalty of customers to the item, whether substitutes for the item can be found, and other factors are used to determine an actions such as increasing or decreasing the shelf space for an item.

16 Claims, 5 Drawing Sheets

(56) References Cited

U.S. PATENT DOCUMENTS

| | | | |
|---|---|---|---|
| 2006/0069749 A1* | 3/2006 | Herz | G06Q 30/02 |
| | | | 709/219 |
| 2006/0074769 A1* | 4/2006 | Looney | G06Q 30/06 |
| | | | 705/14.66 |
| 2010/0094681 A1* | 4/2010 | Almen | G06Q 30/02 |
| | | | 705/7.29 |
| 2010/0145773 A1 | 6/2010 | Desai | |
| 2010/0228604 A1 | 9/2010 | Desai | |
| 2010/0318403 A1* | 12/2010 | Bottom | G06Q 30/0202 |
| | | | 706/54 |
| 2011/0264485 A1 | 10/2011 | Notani | |
| 2012/0095805 A1* | 4/2012 | Ghosh | G06Q 30/0201 |
| | | | 705/7.29 |
| 2012/0245974 A1 | 9/2012 | Bonner | |
| 2012/0280825 A1* | 11/2012 | Sakakihara | G01C 21/08 |
| | | | 340/686.1 |
| 2012/0293305 A1* | 11/2012 | Shaw | H04M 1/72403 |
| | | | 340/8.1 |
| 2013/0322704 A1* | 12/2013 | Harrison | G06V 40/10 |
| | | | 382/115 |
| 2014/0058781 A1 | 2/2014 | Padmanabhan | |
| 2014/0257926 A1* | 9/2014 | Rasband | G06Q 30/0205 |
| | | | 705/7.31 |
| 2014/0337151 A1* | 11/2014 | Crutchfield | G06F 1/1601 |
| | | | 705/17 |
| 2015/0029339 A1* | 1/2015 | Kobres | H04N 7/181 |
| | | | 348/150 |
| 2017/0193434 A1 | 7/2017 | Shah | |
| 2018/0032949 A1* | 2/2018 | Galluzzo | G05D 1/0248 |
| 2019/0005530 A1* | 1/2019 | Greenberger | G06Q 30/0238 |
| 2020/0027099 A1 | 1/2020 | Manna | |
| 2021/0035127 A1* | 2/2021 | Manna | G06Q 10/0637 |

OTHER PUBLICATIONS

Ackerman, Evan; "IAM Robotics Takes on Automated Warehouse Picking"; https://spectrum.ieee.org/automaton/robotics/industrial-robots/iam-robotics-takes-on-automated-warehouse-picking; Jul. 21, 2016; pp. 1-5.

Corsten, Hans et al.; "Regionalized Assortment Planning for Multiple Chain Stores: Complexity, Approximability, and Solution Methods"; 2016; pp. 1-13.

DOTACTIV; Assortment Planning; https://www.dotactiv.com/assortment-planning; May 2, 2018; pp. 1-16.

Gupta et al. (Analytical Model for Automating Purchases using RFID-enabled Shelf and Cart, International Journal of Information and Computation Technology, ISSN 0974-2239 vol. 4, No. (2014), pp. 537-544, International Research Publications House, http://www.irphouse.com /ijict.htm, 2014).

PCT; App. No. PCT/US2019/041107; International Search Report and Written Opinion dated Sep. 24, 2019.

U.S. Appl. No. 16/508,538; Notice of Allowance dated Jul. 17, 2020, (pp. 1-18).

Williams, Andrew; "How Autonomous Mobile Robots Are Changing the Logistics Landscape"; https://www.roboticsbusinessreview.com/supply-chain/autonomous-mobile-robots-changing-logistics-landscape/; Jun. 6, 2018; pp. 1-8.

Zhang, Wei et al.; "Managing Limited Retail Space for Basic Products: Space Sharing vs. Space Dedication"; May 2017; pp. 1-40.

* cited by examiner

SYSTEM AND METHOD FOR PRODUCT ASSORTMENT MANAGEMENT

CROSS-REFERENCE TO RELATED APPLICATIONS

This application is a continuation of U.S. application Ser. No. 16/508,538 filed Jul. 11, 2019, which claims the benefit of Indian Provisional Application No. 201841026788, filed Jul. 18, 2018, and U.S. Provisional Application No. 62/733,412, filed Sep. 19, 2018, all of which are incorporated herein by reference in their entireties.

TECHNICAL FIELD

These teachings relate to the management of the assortment of products in retail stores.

BACKGROUND

Retail stores carry an assortment of products. Assortments define, in some examples, the types, the brands, or the amount of products carried in a particular store.

In larger chains of retail stores, common assortments may be used. That is, rather than every store having a different assortment of products, different stores may have the same assortment. In these regards, the retail stores may be organized as cluster and every store in the cluster has the same assortment.

When the assortment of products for a retail store is not optimal, customers may not purchase the product (or anything else) in the store or may switch their shopping to other stores. This reduces the income and profitability of retail stores that do not have optimal assortment plans.

BRIEF DESCRIPTION OF THE DRAWINGS

The above needs are at least partially met through the provision of approaches that manage the assortment of products in retail stores, wherein.

DETAILED DESCRIPTION

Generally speaking, a system is provided that determines and fine-tunes the assortment of products carried by retail stores. In aspects, the number of stores that carry the item, the sales performance of the item, the loyalty of customers to the item, whether substitutes for the item can be found, and potentially other factors are used to determine actions such as increasing or decreasing the shelf space for an item. The approaches described herein make automated recommendations by consolidating different assortment analysis results to cover different dimensional aspects of products and thereby improve overall product performance and streamline decision making.

In aspects, the same assortment decision is applied for an item in a category for a group of stores (e.g., a cluster), where stores in the cluster are stores with similar customer or product demand patterns. Different automated conditional decisions are utilized for item assortment determination, which are based, in some aspects, on certain item performance metrics, item loyalty measure at the store group level and item substitutability across whole country for that category.

In examples, modular decisions for item assortments are made at a store-group level with stores in the group having similar demand pattern. Thus, the effort for determining different assortment plans for each store and maintaining those in future is reduced. Additionally, the automated recommendations provided herein reduce or eliminate the amount of manual interventions needed to determine an assortment.

In some aspects, the approaches described herein combine sales performance and loyalty measures to distinguish multidimensional aspects of item health. Using these two measures, items are classified into four quadrants with each quadrant having a different significance according to the demand health (performance) of the product and customer engagement (loyalty) health of the product.

In still other aspects, item substitutability measures describe how a product is replaceable. In one aspect, assortment decisions are made based upon this measure (along with other measures). Using substitutability measures in the assortment decisions is particularly effective to cover the effect of the absence of one item on other products at stores in a store group.

In yet other aspects, assortment decisions are modified with a demand transference analysis that describes how much demand of an absent or to-be-deleted product will transfer to other products present in the store. In particular, deletion decisions for products may be modified or changed based upon this analysis. A user can use demand transference analysis along with an automated recommendation determination in an iterative loop in case there are some changes in the final recommendation based upon applying demand transference results to the assortment decision-making process.

In the approaches described herein, assortment plans of items can also be modified for store group where the item is currently not carried by any stores in that group. This aspect enables a user to expand category demand strategically in such regions or areas (e.g., geographic regions or store type) where significant items are not present but have potential to draw customers.

In many of these embodiments, a system that is configured to adjust the assortment of products in retail stores includes a plurality of retail stores, product display units, an automated vehicle, a plurality of sales entry devices, an electronic communication network, and an assortment adjustment apparatus.

The plurality of retail stores are organized as a cluster (or group) and each of the stores in the cluster have a common assortment of products. The product display units are disposed in each of the retail stores in the cluster. The product display units are configured to display the products for sale to customers.

An automated vehicle, first sensor and second sensor are disposed in each of the retail stores of the cluster. The first sensor is configured to scan in real-time the shopping carts or baskets of customers and in real-time obtain shopping cart data indicating items in the shopping cart or basket. The second sensor is configured to obtain customer movement data in real-time by scanning the presence and/or movement of customers viewing a product being displayed at a selected one of the product display units.

The plurality of sales entry devices collect sales information in real-time. The sales entry devices are disposed at retail stores both within and outside of the cluster.

The electronic communication network is coupled to the plurality of sales entry devices, each of the automated vehicles, each of the first sensors, and each of the second sensors.

The assortment adjustment apparatus is coupled to the electronic communication network and disposed at a central processing center. The assortment adjustment apparatus includes a transceiver circuit, a database, and a control circuit. The database is configured to store a retail store count ratio. The retail store count ratio is the percentage of stores in the cluster where a product is carried.

The control circuit is configured to determine performance of the product and customer loyalty to the product for each store in the cluster. The performance of the product is based upon the sales information received from the sales entry devices via the transceiver circuit. The loyalty is a measure of the frequency of customer purchases of the product via the transceiver circuit. The loyalty is determined at least in part based upon an analysis of the customer movement data and correlation of the customer movement data with the sales information.

The control circuit is further configured to determine a substitutability measure for each product. The substitutability measure is associated as to whether first predetermined amounts of traditional substitutes for the product exist and whether second predetermined amounts of variety substitutes exist for each of the products. The substitutability measure is determined at least in part by an analysis of the shopping cart data, and a correlation between the shopping cart data, the customer movement data, and the sales information.

The control circuit is further configured to, based upon the retail store count ratio, the performance of the product, the customer loyalty to the product, and the substitutability measure of the product select an action. The selected action includes one or more of: increasing shelf space for the product, expanding the number of stores carrying the product, obtaining customer feedback, negotiating a deletion of the product, maintaining the product in the stores, decreasing shelf space of the product, or reducing percentage of stores where the product is carried. Other examples of actions are possible. At least some of the actions are performed by the automated vehicle moving products to, from, or within some of the product display units.

In other aspects, the control circuit further forms a list of all products that are to be deleted. When deletion is the selected action, the control circuit is further configured to determine, based upon deletions of products at a national (or some other) level, whether to remove products on the list from stores in the cluster.

In other examples, the control circuit is further configured to determine a no-demand transfer level for a product at the cluster. The no-demand transfer level is associated with the occurrence of no demand for the product transferring to another product. When the no-demand transfer level for a product at a cluster level is below a threshold, all remaining items are removed on the delete list from retail stores in the cluster. When the no-demand transfer level is above the threshold, then a predetermined number of items on the delete list are chosen to be kept in stores (despite being included on the delete list). In some examples, the items on the delete list that are to be kept in the stores (not deleted) are selected based upon the product performance of the product.

In other examples, the product performance is based upon sales values or year-to-year sales growth of the product. Other product performance measures are possible.

In yet other examples, the control circuit is configured to determine clusters that do not have an item or product. In aspects, the control circuit determines for a second cluster where the product is not carried, when a median loyalty is above a first threshold for products carried in the cluster and when a median performance of the products carried at cluster is greater than a second threshold to expand the product into the second cluster.

In others of these embodiments, the assortment of products is adjusted in retail stores. A plurality of retail stores is organized as a cluster (or group). Each of the stores in the cluster has a common assortment of products.

Product display units are disposed in each of the retail stores in the clusters. The product display units are configured to display the products for sale to customers.

Sales information is collected in real-time from a plurality of sales entry devices. The sales entry devices are disposed at retail stores both within and outside of the cluster.

A first sensor, a second sensor, and an automated vehicle are disposed in each store of the cluster. The first sensor is configured to scan in real-time the shopping carts or baskets of customer, and obtain in real-time shopping cart data indicating items in the shopping cart or basket. The second sensor is configured to obtain customer movement data in real-time. The customer movement data indicates the presence and/or movement of customers viewing a product that is displayed at a selected one of the product display units.

A database disposed at a central processing center and stores a retail store count ratio. The retail store count ratio is the percentage of stores in the cluster where a product is carried.

At a control circuit disposed at the central processing center, performance of the product and customer loyalty to the product for each store in the cluster are determined. The performance of the product is based upon sales information received from the sales entry devices via a transceiver circuit. The loyalty is a measure the frequency of customer purchases the product via the transceiver circuit. The loyalty is determined at least in part based upon an analysis of the customer movement data and correlation of the customer movement data with the sales information.

At the control circuit, a substitutability measure is determined for each product. The substitutability measure is associated as to whether first predetermined amounts of traditional substitutes for the product exist and whether second predetermined amounts of variety substitutes exist for each of the products. The substitutability measure is determined at least in part by an analysis of the shopping cart data, and a correlation between the shopping cart data, the customer movement data, and the sales information.

At the control circuit, an action is selected. The selected action is based upon the retail store count ratio, the performance of the product, the customer loyalty to the product, and the substitutability measure of the product. The action includes one or more of: increasing shelf space for the product, expanding the number of stores carrying the product, obtaining customer feedback, negotiating a deletion of the product, maintaining the product in the stores, decreasing shelf space of the product, or reducing percentage of stores where the product is carried. Other examples of actions are possible. At least some of the actions are performed by an automated vehicle by moving products to, from, or within some of the product display units.

Figure 1:
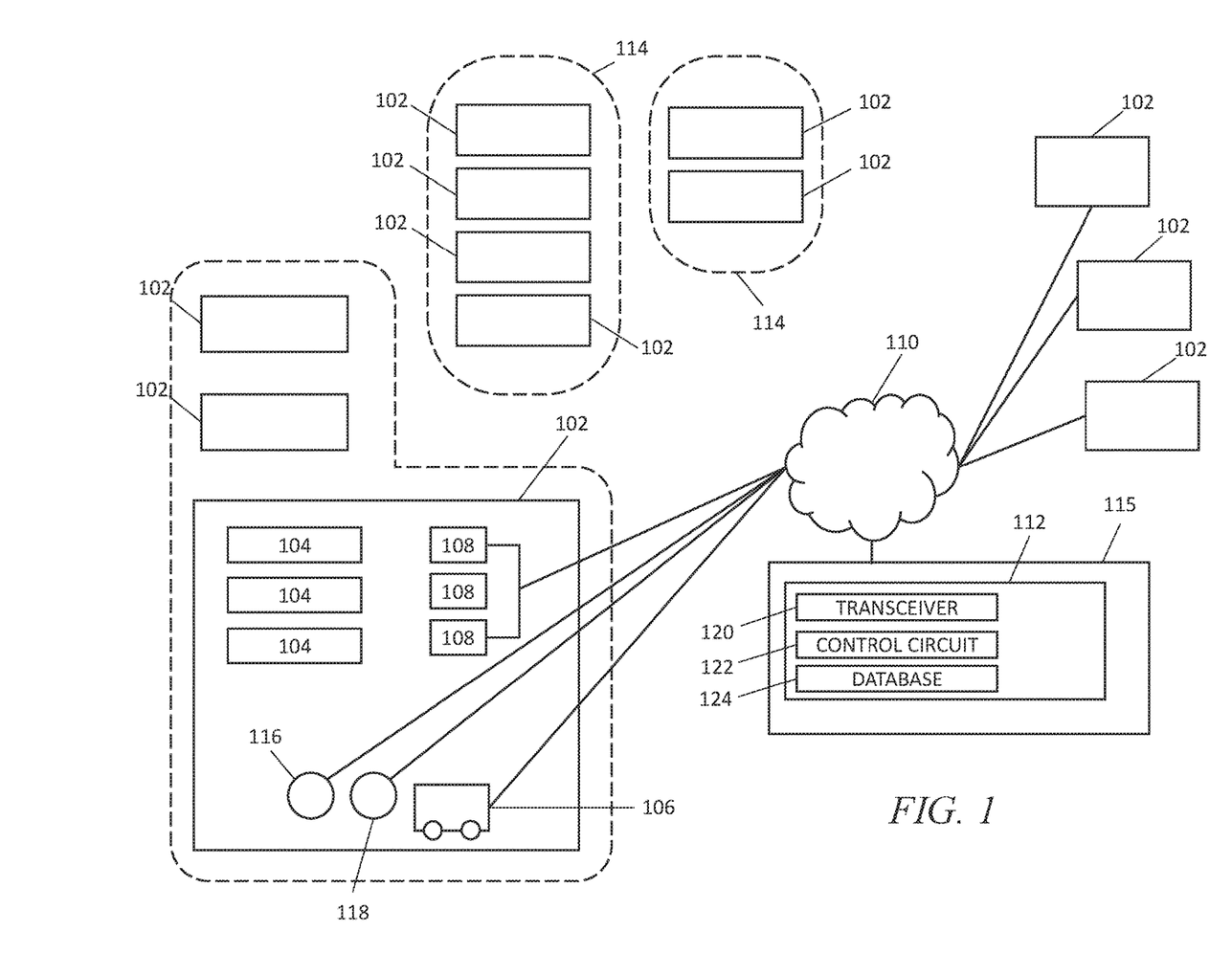
FIG. 1 comprises a diagram of a system as configured in accordance with various embodiments of these teachings.

Referring now to FIG. 1, one example of a system 100 for determining store assortment is described. The system 100 a plurality of retail stores 102. Each of the retail stores 102 includes product display units 104, an automated vehicle 106, a plurality of sales entry devices 108. The system 100 also includes an electronic communication network 110 and an assortment adjustment apparatus 112.

The plurality of retail stores are organized as clusters 114 and each of the stores 102 in each of the clusters 114 have a common assortment of products. Assortments may specify the type, brand, part number, relative percentage, and/or number of specific products carried (or desired or planned to be carried). For example, an assortment for tools may specify that a predetermined number of drills of a certain brand having a specific part number are carried by stores in the cluster. Similar information for saws, screw drivers, hammers, and so forth may also be specified in the assortment. Assortments may include all products in the retail stores 102.

In the example of FIG. 1, some of the stores 102 are located outside of the clusters 114. As will be described herein, some (but not necessarily all) information for making assortment decisions may come from stores 102 both inside and outside the clusters 114.

The product display units 104 are disposed in each of the retail stores 102 in the clusters 114. The product display units 104 are configured to display the products for sale to customers. In these regards, the product display units 104 may be or include shelves, stands, bins, or any other structure that holds, supports, or presents products for sale to the public.

As mentioned, an automated vehicle 106, a first sensor 116 and a second sensor 118 are disposed in each of the retail stores 102 of the cluster. The first sensor 116 is configured to scan in real-time the shopping carts or baskets of customers (or potentially being held in the hands of customers) and in real-time obtain shopping cart data indicating items in the shopping cart or basket. In examples, the first sensor 116 may be a camera or scanner. Multiple first sensors 116 may be deployed in different areas of the stores 102 to obtain this information. Various types of software may be used to discern the identities of products in the shopping cart or basket.

The second sensor 118 is configured to obtain customer movement data in real-time by scanning for the presence of customers viewing a product being displayed at a selected one of the product display units. In examples, the first sensor 116 may be a camera, scanner, or motion detector. Multiple second sensors 118 may be linked together in the retail stores 102 to obtain this data. This data may, in examples, indicate whether a customer is lingering in front of a particular product (e.g., indicating interest), and/or the physical movement of the customer throughout the store. The data may include indications of how long a particular customer positioned themselves in front of a particular product.

It will be appreciated that the various devices, structures, and elements that are positioned in any of the retail stores 102 are for clarity shown as being present in only a single one of the retail stores 102 in FIG. 1. However, it will be appreciated that all of these devices, structures, and elements are disposed in each of the retail stores 102 shown in FIG. 1.

The plurality of sales entry devices 108 collect sales information in real-time. The sales entry devices 108 are disposed at retail stores 102 both within and outside of the clusters 114. In examples, the sales entry devices 108 may be any point-of-sale device such as a cash register, scanner, or similar device. The sales entry devices 108 also include electronic components (e.g., transceivers) that are configured to transmit the collected sales information across the network 110. The information can be transmitted in batches (at predetermined times) or as the information is received.

The electronic communication network 110 is coupled to the plurality of sales entry devices 108, each of the automated vehicles 106, each of the first sensors 116, and each of the second sensors 118. The electronic communication network 110 may be any type of electronic network such as the internet, a wireless network, a cellular network, or combinations of these or other networks.

The assortment adjustment apparatus 112 is coupled to the electronic communication network 110 and disposed at a central processing center 115 (e.g., a company headquarters or home office). The assortment adjustment apparatus 112 includes a transceiver circuit 120, a database 124, and a control circuit 122. The database 124 is configured to store a retail store count ratio. The retail store count ratio is the percentage of stores in the cluster 114 where a product is carried. The transceiver circuit 120 is configured to receive and/or transmit information from or onto the network 110. In examples, the transceiver circuit 120 includes electronic components that make data conversions, act as transmitters, or buffers to store received information. Other examples of components within the transceiver circuits 120 are possible.

The control circuit 122 is coupled to the transceiver circuit 120 and the database 124. It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 122 may be configured (for example, by using corresponding programming stored in a memory as will be well understood by those skilled in the art) to carry out one or more of the steps, actions, and/or functions described herein.

The control circuit 122 is configured to determine the performance of the product and customer loyalty to the product for each store in the cluster. The performance of the product is based upon the sales information received from the sales entry devices 108 via the transceiver circuit 120. The loyalty is a measure of the frequency of customer purchases the product via the transceiver circuit 120. The loyalty is determined at least in part based upon an analysis of the customer movement data and correlation of the customer movement data with the sales information.

The control circuit 122 is further configured to determine a substitutability measure for each product. The substitutability measure is associated as to whether first predetermined amounts of traditional substitutes for the product exist and whether second predetermined amounts of variety substitutes exist for each of the products. The substitutability measure is determined at least in part by an analysis of the shopping cart data, and a correlation between the shopping cart data, the customer movement data, and the sales information.

In aspects, traditional substitutes refer to product substitutions from the same area or of the same type (e.g., either general or specific) as the absent product. For instance, replacing one brand of strawberry yogurt with another brand of strawberry yogurt may constitute a traditional substitute. In aspects, variety substitutes refer to product substitutions outside the same area or type as the absent product. For instance, replacing strawberry yogurt with breakfast cereal may be a variety substitute.

The control circuit 122 is further configured to, based upon the retail store count ratio, the performance of the product, the customer loyalty to the product, and the substitutability measure of the product select an action. The selected action includes one or more of: increasing shelf space for the product, expanding the number of stores carrying the product, obtaining customer feedback, negotiating a deletion of the product, maintaining the product in the stores, decreasing shelf space of the product, or reducing percentage of stores where the product is carried. Other examples of actions are possible.

At least some of the actions are performed by the automated vehicle 106 moving products to, from, or within some of the product display units. The automated vehicle 106 may be a drone or automated ground vehicle, or combinations of these or other vehicles. In aspects, the automated vehicles 106 may move items within a shelf, from shelf-to-shelf, between different areas of the store, or from the backroom or storeroom to the public sales area. In still other examples, automated vehicles 106 may be responsible for transporting items from warehouses to the retail stores 102.

In other aspects, the control circuit 122 further forms a list of all products that are to be deleted. When deletion is the selected action, the control circuit is further configured to determine, based upon deletions of products at a national level, whether to remove products on the list from stores in the cluster. For example, a rule that specifies only 80 percent of the products on the list can be deleted may be enforced.

In other examples, the control circuit 122 is further configured to determine a no-demand transfer level for a product at selected ones of the clusters 114. The no-demand transfer level is associated with occurrence of no demand for the product transferring to another product. In this example, a delete list that specifies the items or products to be deleted from the assortment of items carried by stores in a cluster has been created. When the no-demand transfer level for a product at a cluster level is below a threshold, all remaining items on the delete list are removed on the delete list from retail stores 102 in the cluster 114. When the no-demand transfer level is above the threshold, then a predetermined number of items on the delete list is chosen to be kept in stores 102. In some examples, the items on the delete list that are to be kept are selected based upon the product performance of the product.

In other examples, the product performance is based upon sales values or year-to-year sales growth of the product. Other measures of performance can also be utilized.

In yet other examples, the control circuit 122 is configured to determine or identify clusters 114 that do not have or carry an item or product. In aspects, the control circuit 122 determines for one of the clusters where the product is not carried, when the median loyalty for all the products carried by the cluster is above a first threshold. A determination is also made as to when the median performance of all the products carried at a cluster is greater than a second threshold. If both of these conditions are met, a decision is made to expand the missing product into the cluster.

Figure 2:
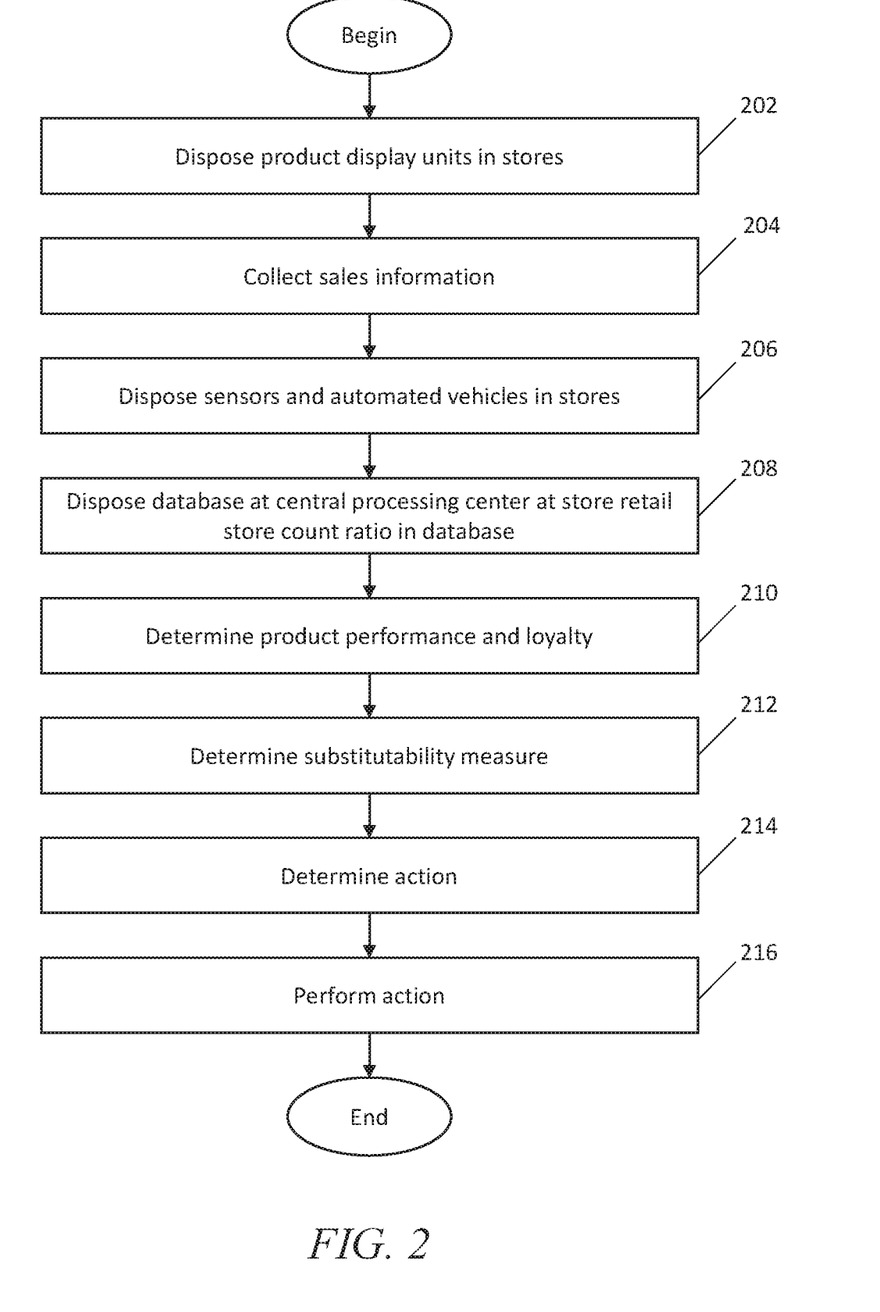
FIG. 2 comprises a flowchart as configured in accordance with various embodiments of these teachings.

Referring now to FIG. 2, an approach for the assortment of products in retail stores is described. A plurality of retail stores is organized as a cluster. Each of the stores in the cluster has a common assortment of products.

At step 202, product display units are disposed in each of the retail stores in the clusters. The product display units are configured to display the products for sale to customers. In examples, the product display units may be or contain stands, shelves, holders, hooks, or another other mechanism that can be used to present products to the public for sale.

At step 204, sales information is collected in real-time from a plurality of sales entry devices. The sales entry devices are disposed at retail stores both within and outside of the cluster. The sales entry device may be a scanner or cash register. Other examples of sales entry devices are possible.

At step 206, a first sensor, a second sensor, and an automated vehicle are disposed in each store of the cluster. The first sensor is configured to scan in real-time the shopping carts or baskets of customer, and obtain in real-time shopping cart data indicating items in the shopping cart or basket. For example, the first sensor may be a camera that obtains images that are processed to determine the content of the shopping carts of customers.

The second sensor is configured to obtain customer movement data in real-time. The customer movement data indicates the presence of customers viewing a product that is displayed at a selected one of the product display units. In examples, the second sensor or sensors may be cameras, temperature sensors, or motion detectors (or combinations of these and other devices). Data from the second sensors may be processed to determine the presence of a person near a product and/or the duration of the stay of the person in front of the product. Longer durations of stay may indicate greater interest or loyalty with the product.

At step 208, a database disposed at a central processing center stores a retail store count ratio. The retail store count ratio is the percentage of stores in the cluster where a product is carried.

At step 210 and at a control circuit disposed at the central processing center, performance of the product and customer loyalty to the product for each store in the cluster are determined. The performance of the product is based upon sales information received from the sales entry devices via a transceiver circuit. For example, sales data per unit of time may be determined.

The loyalty is a measure the frequency of customer purchases the product via the transceiver circuit. The loyalty is determined at least in part based upon an analysis of the customer movement data and correlation of the customer movement data with the sales information. For example, a determination may be made as to how long a customer lingered in front of a product display for a product and this is correlated with whether the customer purchased the product. In aspects, when the customer lingered for a predetermined amount of time in front of the product and/or purchased the product, this indicates a high customer loyalty to the product.

At step 212 and at the control circuit, a substitutability measure is determined for each product. The substitutability measure is associated as to whether first predetermined amounts of traditional substitutes for the product exist and whether second predetermined amounts of variety substitutes exist for each of the products. The substitutability measure is determined at least in part by an analysis of the shopping cart data, and a correlation between the shopping cart data, the customer movement data, and the sales information.

To take one example, a correlation is made as to whether a customer substituted one product for another product. This can be determined by analyzing the contents of the cart of the customer, whether the customer moved from the display of one product (that was absent) to another second or substitute product, and then eventually purchased the substitute product.

At step 214 and at the control circuit, an action is selected. The selected action is based upon the retail store count ratio, the performance of the product, the customer loyalty to the product, and the substitutability measure of the product, the action including one or more of: increasing shelf space for the product, expanding the number of stores carrying the product, obtaining customer feedback, negotiating a deletion of the product, maintaining the product in the stores, decreasing shelf space of the product, or reducing percentage of stores where the product is carried.

At step 216, at least some of the actions are performed by an automated vehicle by moving products to, from, or within some of the product display units. For example, automated vehicles can remove items from shelves, move items within shelves, or move items between different areas of the store to mention a few examples.

Figure 3:
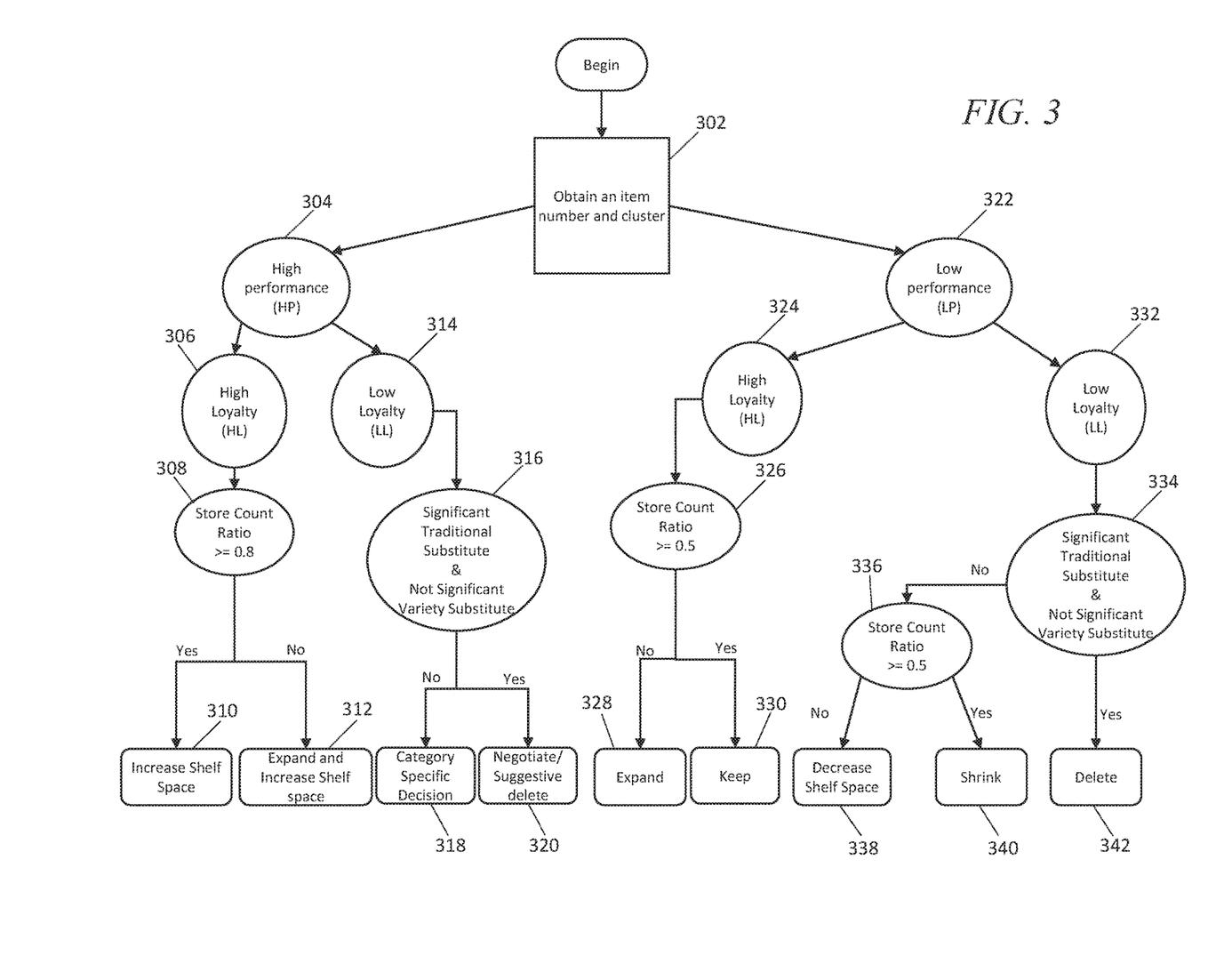
FIG. 3 comprises a flowchart as configured in accordance with various embodiments of these teachings.

Referring now to FIG. 3, one approach for determining an assortment recommendation is described. The recommendation is to be made for stores in a cluster of stores. The recommendation may be, in aspects, to increase the shelf space of an item, decrease the shelf space of an item, delete the item from the store, or add the item to the store, to mention a few examples. These actions may be implemented by automated vehicles (and/or humans).

At step 302, the item number and cluster number are obtained. Using this information, various types of information as to how the product performed is obtained. For example, information concerning the sales performance of the product at the cluster is obtained from a database using the sale information as indices to the database.

At step 304, it is determined that the product has obtained a high sales performance. This determination may be made if a product performance measure (e.g., unit sales or dollar sales) exceeded a threshold over a predetermined period of time. Product performance, in aspects, may be determined by sales data only within the cluster.

A determination is then made about the customer loyalty to the product. The loyalty may relate to the amount of time spent by customers viewing a product or by how many times a customer purchases the product. The loyalty may be determined from data from stores both within the cluster and outside the cluster (e.g., across the country). A high loyalty is determined at step 306. High loyalty refers to when the performance measure for loyalty exceeds a threshold. Next, at step 308, it is determined whether the store count ratio is greater than or equal to 0.8. It will be appreciated that 0.8 is one example of a store count ratio, and that other examples are possible.

If the answer is affirmative, at step 310 shelf space for the item is increased in stores in the cluster. If the answer is negative, the item is expanded into other stores in the cluster and shelf space for the item is increased.

At step 314, a high-performance item is determined to have low customer loyalty. Next, at step 316, a determination is made whether there are significant traditional substitutes and not significant variety substitutes. By "significant" and as used herein, it is meant that a number of substitute products exceeds (or in some cases is equal) to some predetermined threshold. By "insignificant" and as used herein, it is meant that a number of substitute products is less than (or in some cases is equal) to some other predetermined threshold.

If the answer is negative, at step 318 a category specific decision (e.g., delete or keep the product) is made. For instance, feedback may be obtained to make a category-specific decision. The feedback can come from customers, management, or other stores within or outside the cluster. If the answer is affirmative, then negotiations are made with the store (or others such as suppliers or manufacturers) as to whether to delete the item. A communication (e.g., email) may be sent to the store requesting this action be followed.

At step 322, the item has been determined to be a low performing item. Next, a determination is made as to the loyalty of the customer to the product. Step 324 determines that the loyalty is high. Next, at step 326, a determination is made as to whether the store count ratio is greater or equal to 0.5. It will be appreciated that 0.5 is one example of a store count ratio and that other examples can be used. If the answer is negative, at step 328, the item is expanded into other stores. If the answer is affirmative, the item is kept as-is in the stores.

Step 332 determines that the product has low loyalty among consumers. Next, at step 334, a determination is made as to whether a significant amount of traditional substitutes exist and whether the amount of variety substitutes that exist are not significant. If the answer at step 334 is affirmative, the item is either deleted or added to a delete list (e.g., a list of items to be deleted from the stores). If the answer at step 334 is negative, then at step 336 a determination is made as to whether the store count ratio is greater or equal to 0.5. It will be appreciated that 0.5 is one example of a store count ratio and that other examples can be used. If the answer at step 336 is negative, at step 338, the amount of shelf space for the product is decreased. If the answer at step 336 is affirmative, then at step 340 either the percentage of the products in the stores, the percentages of stores carrying the product is reduced.

Figure 4:
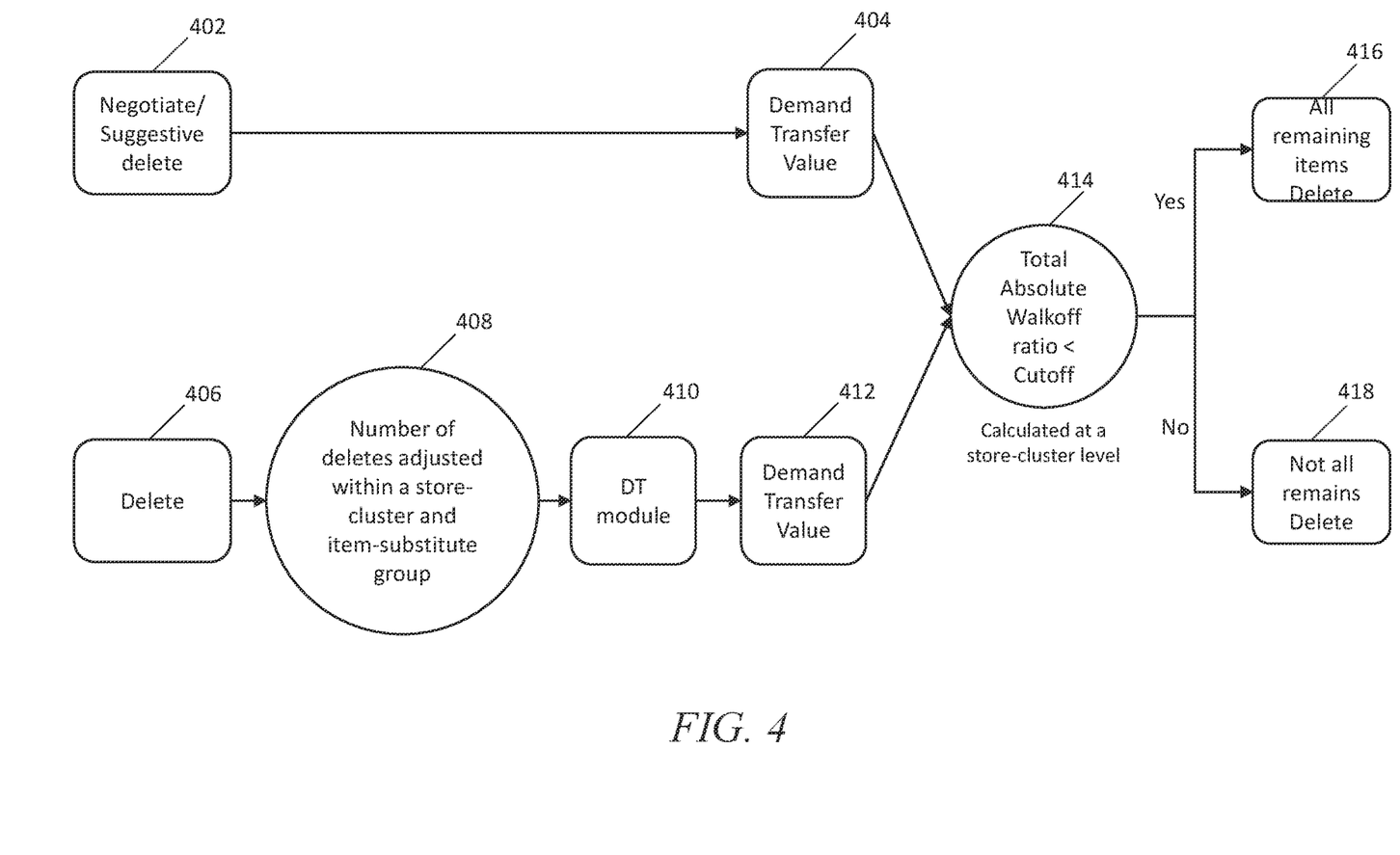
FIG. 4 comprises a flowchart as configured in accordance with various embodiments of these teachings.

Referring now to FIG. 4, one example of an approach for adjusting the items to be deleted. The approach of FIG. 4 may be executed after the approach of FIG. 3 has been performed. The example of FIG. 4 assumes a delete list has been formed, for example, by performing the approach of FIG. 3 across a group of products.

At step 402, a decision has been made to negotiate or suggest a delete. At step 404, the demand transfer value is calculated, for example at or by a demand transfer module (e.g., a software module). This step involves determining or obtaining the amount of demand that transfers to another product. If a product is deleted, demand will transfer to one or more products. The values are calculated on a product at the cluster level. For example, a number may represent the amount of demand for a product that will transfer to another product. This may be some real number or a percentage. This amount may be calculated as part of this step or have been previously calculated by or at some other entity and supplied to the approach of FIG. 4. Step 414 is performed next as described below.

At step 406, a list of items to be deleted is received. At step 408, the number of items to be deleted within a cluster is adjusted. For example, a rule may exist specifying that a maximum of 80 percent of items from the delete list can be deleted. This information may come from national sales numbers or be required by company management or supervisors, in some examples.

At step 410, the items now set for deletion from the cluster are sent to a demand transfer module (e.g., implemented as software) for calculation of the demand transfer value. At step 412, the demand transfer value is calculated. As mentioned, this step involves making a determination of the amount of demand that transfers to another product. If a product is deleted, demand will transfer to one or more products. The values are calculated on a product at the cluster level.

At step 414, the total walk-off ratio is calculated. As described herein, the total walk-off ratio is the percentage (or amount) of demand that does not transfer to other products when a product is not available. In other words, the total walk-off is the lost or not transferred amount of demand. In one example, 10% of the demand for an unavailable product goes to product 1, 40% to product 2, and the remaining 50% does not get transferred. Consequently, the total walk-off ratio is 50%. The walk-off may be calculated at least in part by using the results of the demand transfer analysis, which may specify how much demand was not transferred.

Step 414 determines whether the absolute walk-off ration is less than a predetermined cut-off or threshold. If the answer is affirmative, then at step 416 all remaining items on the list are deleted from the stores. If the answer is negative, then at step 418 not all items on the list are deleted from the stores. For example, top performing items may be maintained or kept in the stores.

Then, for items still on the list (or possibly items removed from the delete list), the algorithm of FIG. 3 may be applied again. In one example, if the cutoff were 10%, but walk-off is 12%, items may be removed from the delete list (and thus kept in the stores). The effect of the deletions may be to reduce the walk-off ratio.

In other words, a user can use demand transference analysis (of FIG. 4) with automated recommendation in an iterative loop (in FIG. 3) in case there are some changes in final recommendation based on demand transference results. Put another way, "delete" decisions for some products may be changed to not delete decisions. This results in a more effective and accurate product assortment determination.

Figure 5:
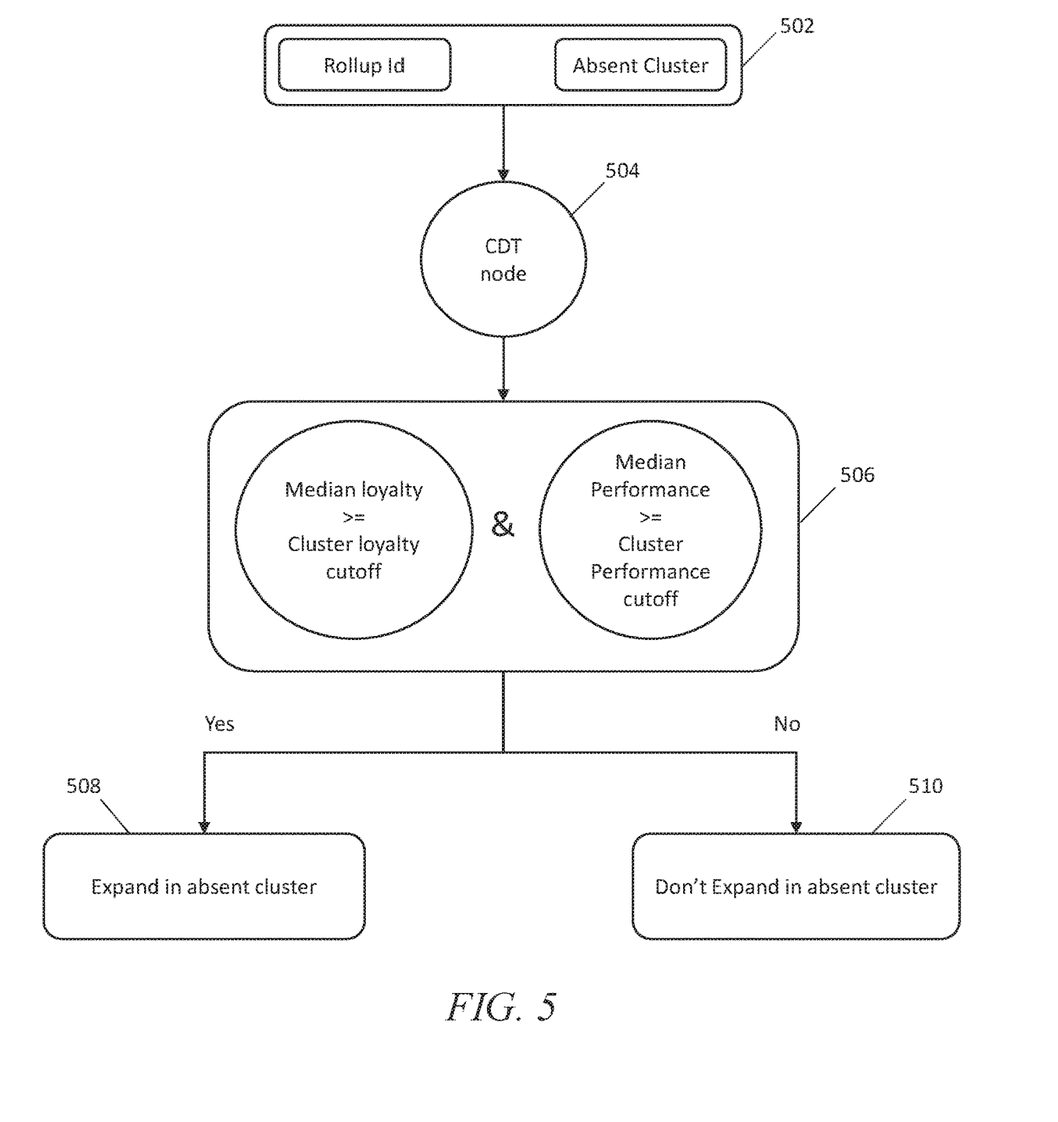
FIG. 5 comprises a flowchart as configured in accordance with various embodiments of these teachings.

Referring now to FIG. 5, one example for determining whether a product should be added to a cluster is described. In another words, an item may be added to an assortment for a cluster when the item is not carried by the cluster. In the example of FIG. 5, assume retail store clusters A, B, C, and D. An item is carried in clusters A, B, C, but not in cluster D.

At step 502, the item number and cluster number (or other cluster identifier) are obtained. Using this information, various types of information as to how the product performed is obtained. For example, information concerning the sales performance of the product at the cluster is obtained from a database.

At step 504, a mapping may define items in a group and identify which clusters carry the items and which clusters do not carry the item. In one example, a customization decision tree (CDT) node is used. In this example, a CDT node has items in a group (I1 I2 . . . I10). Item I1 is not carried by cluster D, while items I2 . . . 10 are carried. Everything (items I1 . . . I10) is carried by clusters A, B, and C.

At step 506, a determination is made as to whether a median cluster loyalty of the items at cluster D (all the items cluster D is carrying) is greater than a customer loyalty threshold. The cluster loyalty threshold may reflect how often customers purchased an item, or how long customers lingered in front of an item in a store to mention two examples. In other aspects, the loyalty may be measured for all products across all clusters. Also, a determination is made as to whether a median performance of the items at cluster D (the items cluster D is carrying) is greater than a performance threshold. In other aspects, the performance may be measured for all products across all clusters. Average loyalty and performance values may also be obtained and used.

If both of these conditions are met, then a decision is made to expand the item (e.g., item I1) into the cluster D at step 508. Otherwise, at step 510, the decision is made not to expand the item into cluster D.

It will be appreciated that this is an example of a scope of recommending assortment plan of items in such a store group where that item is currently not carried by any stores in that group. This enables a user to expand category demand strategically in such regions, areas, store types where significant items are not present but have potential to draw customers.

It will also be understood that the example approaches of FIG. 4 and FIG. 5 can be used to fine tune the results after executing the approach of FIG. 3.

In some embodiments, one or more of the exemplary embodiments include one or more localized IoT devices and controllers. As a result, in an exemplary embodiment, the localized IoT devices and controllers can perform most, if not all, of the computational load and associated monitoring and then later asynchronous uploading of data can be performed by a designated one of the IoT devices to a remote server. In this manner, the computational effort of the overall system may be reduced significantly. For example, whenever a localized monitoring allows remote transmission, secondary utilization of controllers keeps securing data for other IoT devices and permits periodic asynchronous uploading of the summary data to the remote server. In addition, in an exemplary embodiment, the periodic asynchronous uploading of data may include a key kernel index summary of the data as created under nominal conditions. In an exemplary embodiment, the kernel encodes relatively recently acquired intermittent data ("KRI"). As a result, in an exemplary embodiment, KRI includes a continuously utilized near term source of data, but KM may be discarded depending upon the degree to which such KM has any value based on local processing and evaluation of such KM. In an exemplary embodiment, KRI may not even be utilized in any form if it is determined that KM is transient and may be considered as signal noise. Furthermore, in an exemplary embodiment, the kernel rejects generic data ("KRG") by filtering incoming raw data using a stochastic filter that provides a predictive model of one or more future states of the system and can thereby filter out data that is not consistent with the modeled future states which may, for example, reflect generic background data. In an exemplary embodiment, KRG incrementally sequences all future undefined cached kernals of data in order to filter out data that may reflect generic background data. In an exemplary embodiment, KRG incrementally sequences all future undefined cached kernals having encoded asynchronous data in order to filter out data that may reflect generic background data. In a further exemplary embodiment, the kernel will filter out noisy data ("KRN"). In an exemplary embodiment, KRN, like KM, includes substantially a continuously utilized near term source of data, but KRN may be retained in order to provide a predictive model of noisy data. In an exemplary embodiment, KRN and KRI, also incrementally sequences all future undefined cached kernels having encoded asynchronous data in order to filter out data that may reflect generic background data.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A system that is configured to adjust the assortment of products in retail stores, the system comprising:
   a first retail store and a second retail store organized as a cluster;
   a third retail store that is organized outside of and not a part of the cluster;
   product display units in each of the first retail store, the second retail store, and the third retail store, the product display units configured to display the products for sale to customers;
   a plurality of sales entry devices that collect and transmit sales information, the sales entry devices being disposed at the first retail store, the second retail store, and the third retail store, the sale entry devices including sensors that obtain the sales information, the sensors being cameras or scanners that are configured to automatically and in real-time obtain information concerning items being purchased by customers;
   an electronic communication network that is coupled to the plurality of sales entry devices;
   an assortment adjustment apparatus that is coupled to the electronic communication network and disposed at a central processing center, the assortment adjustment apparatus including a transceiver circuit, a database, and a control circuit;
   wherein the sales information is selectively transmitted across the electronic communication network in batches or in real-time;
   wherein the database is configured to store a retail store count ratio, the retail store count ratio being a percentage of retail stores in the cluster where a product is carried;
   wherein the control circuit is configured to:
      determine performance of the product and customer loyalty to the product for the first retail store and the second retail store, the performance of the product being based upon the sales information received from the cameras or the scanners of the sales entry devices via the transceiver circuit, the loyalty being a measure of a frequency of customer purchases of the product, the loyalty being determined at least in part based upon an analysis of the sales information obtained by the scanners or cameras;
      determine a substitutability measure for each product, the substitutability measure being determined at least in part by an analysis of the sales information obtained by the scanners or cameras;
      based upon the retail store count ratio, the performance of the product, the customer loyalty to the product, and the substitutability measure of the product, select an action including one or more of:
      electronically controlling a first automated device and/ or sending first electronic instructions to the first retail store in the cluster to move first products in the first retail store into a first arrangement or assortment;
      electronically controlling a second automated device and/or sending second electronic instructions to the second retail store in the cluster to move second products in the second retail store into the first arrangement or assortment;
      electronically controlling a third automated device and/ or sending third electronic instructions to the third retail store to move third products in the third retail store into a second arrangement or assortment, the second arrangement or assortment being different than the first arrangement or assortment;
   wherein moving the products involves one or more of physically moving products within shelves or physically moving products between shelves.

2. The system of claim 1, where the control circuit further forms a list of all products that are to be deleted;
   wherein, when deletion is the selected action, the control circuit is further configured to determine, based upon deletion of products at a national level, whether to remove products on the list from retail stores in the cluster.

3. The system of claim 2, wherein the control circuit is configured to determine a no-demand transfer level for a product at the cluster, the no-demand transfer level associated with occurrence of no demand for the product transferring to another product, and when the no-demand transfer level for a product at a cluster level is below a threshold, remove all remaining items on a delete list from retail stores in the cluster, and when the no-demand transfer level is above the threshold, then choose a predetermined number of items on the delete list to keep in retail stores.

4. The system of claim 3, wherein the items on the delete list that are to be kept are selected based upon the performance of the product.

5. The system of claim 1, wherein the performance of the product is based upon sales values or year-to-year sales growth of the product.

6. The system of claim 1, wherein the control circuit is configured to determine clusters that do not have an item.

7. The system of claim 6 wherein the control circuit determines for a second cluster where the product is not carried, when a median loyalty is above a first threshold for products carried in the cluster and when a median performance of the products carried at the cluster is greater than a second threshold to expand the product into the second cluster.

8. The system of claim 1, wherein the first automated device, second automated device, and third automated device comprise automated vehicles.

9. A method for adjusting an assortment of products in retail stores, the method comprising:
   organizing a first retail store and a second retail store organized as a cluster;
   organizing a third retail store outside of and not a part of the cluster;
   collecting and transmitting sales information across an electronic communication network from a plurality of sales entry devices, the sales entry devices being disposed at the first retail store, the second retail store, and the third retail store, the sale entry devices including sensors that obtain the sales information, the sensors being cameras or scanners that are configured to automatically and in real-time obtain information concerning items being purchased by customers;
   wherein the sales information is selectively transmitted across the electronic communication network in batches or in real-time;
   storing at a database disposed at a central processing center a retail store count ratio, the retail store count ratio being a percentage of retail stores in the cluster where a product is carried;
   at a control circuit disposed at the central processing center, determining performance of the product and customer loyalty to the product for the first retail store and the second retail store, the performance of the product being based upon the sales information received from the scanners or cameras of the sales entry devices via a transceiver circuit, the loyalty being a measure of a frequency of customer purchases the product, the loyalty being determined at least in part based upon an analysis of the sales information obtained by the scanners or cameras;

at the control circuit, determining a substitutability measure for each product, the substitutability measure being determined at least in part by an analysis of the sales information obtained by the scanners or cameras;

at the control circuit, selecting an action, the selected action based upon the retail store count ratio, the performance of the product, the customer loyalty to the product, and the substitutability measure of the product, the action including one or more of:

electronically controlling a first automated device and/or sending first electronic instructions to the first retail store in the cluster to move first products in the first retail store into a first arrangement or assortment;

electronically controlling a second automated device and/or sending second electronic instructions to the second retail store in the cluster to move second products in the second retail store into the first arrangement or assortment;

electronically controlling a third automated device and/or sending third electronic instructions to the third retail store to move third products in the third retail store into a second arrangement or assortment, the second arrangement or assortment being different than the first arrangement or assortment;

wherein moving the products involves one or more of physically moving products within shelves or physically moving products between shelves.

10. The method of claim 9, further comprising, at the control circuit, forming a list of all products that are to be deleted;

wherein, when deletion is the selected action, the control circuit is further configured to determine, based upon deletion of products at a national level, whether to remove products on the list from retail stores in the cluster.

11. The method of claim 10, further comprising, at the control circuit, determining a no-demand transfer level for a product at the cluster, the no-demand transfer level associated with occurrence of no demand for the product transferring to another product, and when the no-demand transfer level for a product at a cluster level is below a threshold, and removing all remaining items on a delete list from retail stores in the cluster, and when the no-demand transfer level is above the threshold, then choosing a predetermined number of items on the delete list to keep in retail stores.

12. The method of claim 11, wherein the items on the delete list that are to be kept are selected based upon the performance of the product.

13. The method of claim 9, wherein the performance of the product is based upon sales values or year-to-year sales growth of the product.

14. The method of claim 9, further comprising, at the control circuit, determining clusters that do not have an item.

15. The method of claim 14, further comprising, at the control circuit, determining for a second cluster where the product is not carried, when a median loyalty is above a first threshold for products carried in the cluster and when a median performance of the products carried at the cluster is greater than a second threshold to expand the product into the second cluster.

16. The method of claim 9, wherein the first automated device, second automated device and third automated device comprise automated vehicles.

* * * * *